March 22, 1966      H. C. MASON      3,241,309
CONNECTING LINK
Filed Dec. 4, 1963
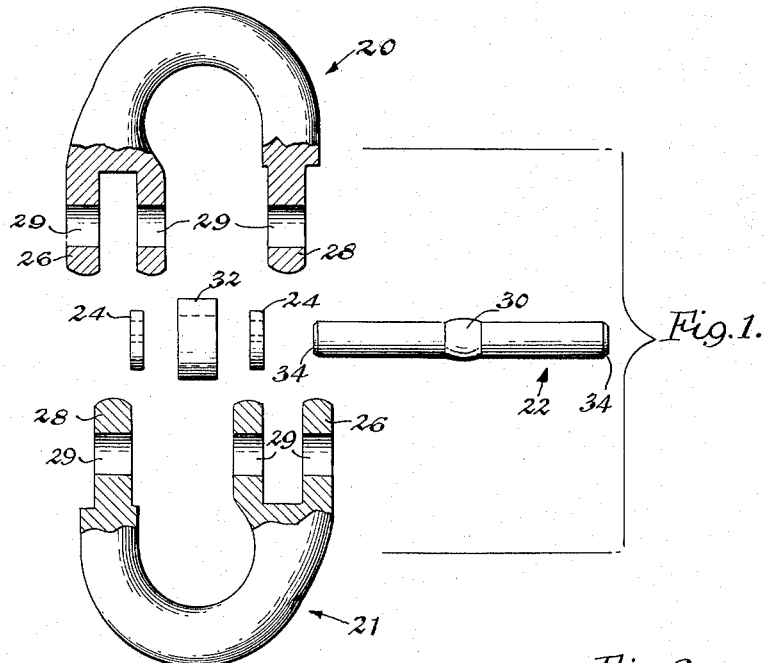
Fig. 1.
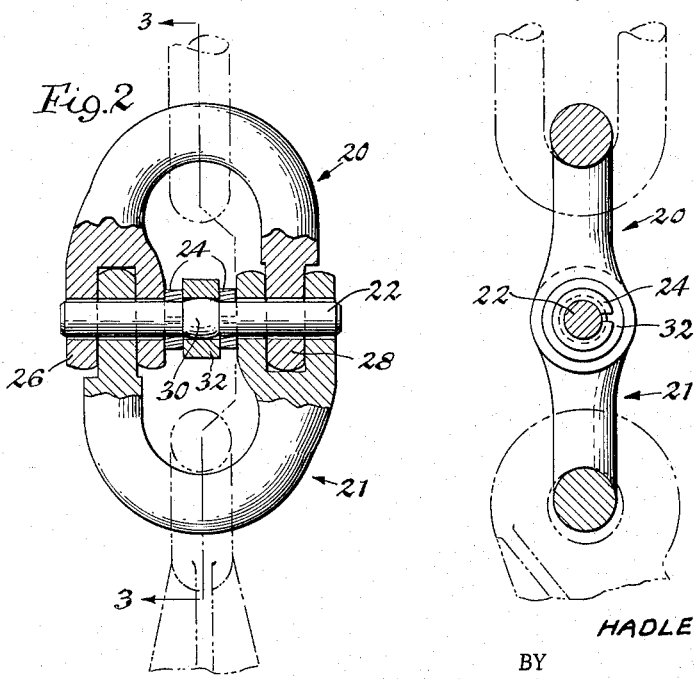
Fig. 2.
Fig. 3.
INVENTOR.
HADLEY C. MASON
BY
Bean, Brooks, Buckley & Bean
ATTORNEYS

United States Patent Office 3,241,309
Patented Mar. 22, 1966

3,241,309
CONNECTING LINK
Hadley C. Mason, Tonawanda, N.Y., assignor to Columbus McKinnon Corporation, Tonawanda, N.Y.
Filed Dec. 4, 1963, Ser. No. 327,957
4 Claims. (Cl. 59—85)

This invention relates to devices for detachably joining together lengths of chain, or lengths of chain to hooks, or the like; and pertains more particularly to improvements in joiner link assemblies featuring convenience in assembly while at the same time being structurally simple and rugged, and economical to manufacture.

Such links are useful for many applications, and as explained for example in U.S. Patent No. 2,972,223, it is highly desired that such devices may be applied with ease and rapidity and with the tools which may be readily at hand. Furthermore, such devices must be able to withstand abuses such as are normally encountered in service.

It is a primary object of the present invention to provide an improved form of joiner link assembly which is characterized by its ability to be easily assembled by means usually available, such as a hammer, wrench, stone, or any other object suitable for striking a blow.

Another object of this invention is to provide an improved form of joiner link assembly incorporating a pair of identical, generally U-shaped, coupling members, terminating in open end portions which are easily interdigitated and secured together by means of a pin, and spring-fitting locking means securely holding the pin in place in improved manner.

Another object of this invention is to provide, in combination with an improved joiner link assembly as aforesaid, means cooperable therewith to maintain the pin lock assembly in proper relationship while at the same time shielding it against external blows, abrasions, or the like, and especially designed to withstand the maximum abuse normally expected to be encountered in service without loosening of the pin.

Other objects and advantages of the invention will be apparent from the following specification of examples of the inventive construction, reference being had to the accompanying drawings forming a part hereof, in which:

FIG. 1 is an exploded elevational view, partly in section, showing an improved joiner link device of the present invention;

FIG. 2 is an elevational view, also partly in section, showing the parts of FIG. 1 in assembled relation; and FIG. 3 is a sectional view taken along line 3—3 of FIG. 2.

Referring now to the example of the invention as shown in the drawing, the component parts of the assemblage are shown to include a pair of similarly formed half links 20 and 21, a joining pin 22, and a pair of locking spring-collars 24—24. The two half links are of similar construction; each half link being of generally U-shaped configuration (FIGS. 1, 2) thus providing substantially parallel legs alternately terminating in clevis and eye-shaped end portions 26, 28. The ends of the legs are preferably machined such that their opposite side faces are flat and substantially parallel to each other, and are formed with transverse bores, as indicated by the reference character 29 (FIG. 1) to receive the pin 22.

As shown in FIG. 3 the locking sleeves or collars 24—24 comprise springs of C-shaped configuration, dimensioned to provide longitudinal bores therethrough which when in spring-relaxed condition are of diameters about equal to or less than that of the opposite end portions of the lock pin 22 which are of substantially equal and uniform diameter. However, the central portion 30 of the pin is of enlarged knob-shaped form to thereby provide shoulders of enlarged diameters against which the spring-sleeves 24—24 resiliently lock when the device is assembled.

Locking devices such as the sleeves 24—24 are subject to considerable abuse in service, and breakage and/or loosening and separation thereof from the pin 22 may occur as a result. For example, the impact of blows directly on such devices, particularly from parts connected by the joiner link assembly as illustrated in phantom on FIGS. 2, 3 can result in deformation of the parts to a point where the pin 22 may become loosened and fall out of the assembly. This of course would result in complete malfunctioning of the joiner link assembly. To prevent this undesirable result, means are provided for shielding the pin lock device from such hazards when in service. As shown in FIGS. 1, 2 such means may comprise a ring 32 which is centrally bored to slip-fit over the enlarged knob portion 30 of the pin 22; the ring 32 being dimensioned to extend radially beyond the outside diameter configurations of the spring sleeves 24—24, whereby to shield the springs from damaging blows during service, thus preventing deformation of the sleeves and forestalling unintended separation of pin 22 from the assembly.

To assemble the device of the invention the two half coupling parts 20, 21 are first slip-fitted into engagement with the chain or other parts to be interconnected, and are then brought into the assembled relation shown in FIG. 2. The unit comprising the spring sleeves 24—24 and the ring 32 is then positioned between the parts, as shown in FIG. 2. The pin 22 is then driven from either side length-wise through the coupling link bores 29 until the bulge portion 30 expands and passes through the lead spring 24, whereupon the lead spring snap-fits back around the normal diameter portion of the pin behind the knob portion 30 thereof. The knob portion 30 is thereby disposed within the ring 32. To facilitate this operation the ends of the pin 22 are slightly pointed or beveled as indicated at 34. Thus, the coupling parts, 20, 21 are now interconnected by means of the hinge pin 22; the latter being held in proper position by the spring-sleeves 24—24 operating against the shoulders of the knob 30, while the ring 32 shields the springs against damage from external forces. The parts may be subsequently disassembled by simply driving the pin 22 out by means of a punch and hammer blows.

It will be appreciated that the invention may be embodied in a variety of modified forms of the component parts, and that although only one form has been illustrated and described in detail herein, various changes may be made therein without departing from the spirit of the invention or the scope of the following claims.

I claim:

1. A joiner link assembly comprising a pair of identical, substantially U-shaped, half coupling links each having one leg terminating in an eye portion having flat opposite sides and the other leg terminating in an end portion notched inwardly thereof to define a clevis device, the eye and clevis portions of said half links being interdigitated and provided with axially aligned bores, a hinge pin passing through all of said bores to pivotally join said half links, said pin having opposite end portions of substantially equal and uniform diameter passing through the interdigitated ends of the half links and having a portion of enlarged diameter disposed between said coupling links leg portions, a pair of coiled spring members, each elastically constricted upon said pin and bearing laterally against opposite sides of said enlarged diameter portion of said pin, thereby detachably locking said pin and half coupling links in assembled relation, and shield means carried by said pin between said link portions and extending radially adjacent to and beyond the diametrical extent of said spring members and thereby protruding therebeyond to shield said spring members from contacts with foreign objects.

2. A joiner link assembly comprising a pair of identical, substantially U-shaped, half coupling links having leg portions disposed in side-by-side lapped relation and provided with axially aligned bores, a hinge pin passing through said bores to pivotally join said half links, said pin having opposite end portions of normal diameter passing through the lapped ends of the half links and a central portion of enlarged diameter disposed between said coupling links leg portions, a pair of coiled spring members elastically constricted upon said pin and bearing laterally against opposite sides of said enlarged diameter portion of said pin thereby detachably locking said pin and half coupling links in assembled relation, and shield means disposed between said link portions and extending beyond the profiles of said spring members and thereby shielding said spring members from contacts with foreign objects.

3. A joiner link assembly comprising a pair of identical, substantially U-shaped, half coupling links having corresponding leg portions disposed in lapped relation and defining an open space therebetween, said leg lapped portions being formed with axially aligned bores, a hinge pin passing through said bores to pivotally join said half links, said pin having opposite end portions of equal diameter passing through the lapped ends of the half links and having a portion of enlarged diameter disposed in said open space between said coupling links leg portions, a pair of spring sleeve members carried by said pin and elastically constricted to bear laterally against opposite sides of said enlarged diameter portion of said pin thereby detachably locking said pin and half coupling links in assembled relation, and shield means disposed between said link portions and extending beyond the profiles of said spring members and thereby protruding therebeyond to shield said spring members.

4. A link assembly comprising a pair of substantially U-shaped, half coupling links having leg portions disposed at corresponding ends in side-by-side lapped relation and formed thereat with axially aligned bores, a hinge pin passing through said bores to pivotally join said half links, said pin having opposite end portions of similar diameter passing through the lapped ends of the half links and having a portion of enlarged diameter disposed between said coupling links leg portions, a pair of spring sleeve members encircling said pin and bearing laterally against opposite sides of said enlarged diameter portion of said pin thereby detachably locking said pin and half coupling links in assembled relation, and shield means disposed between said link portions and extending beyond the profiles of said spring members to shield said spring members from contacts with foreign objects.

References Cited by the Examiner

UNITED STATES PATENTS

| | | | |
|---|---|---|---|
| 2,648,989 | 8/1953 | Cordis | 59—85 |
| 2,972,223 | 2/1961 | Devonshire et al. | 59—88 |
| 3,134,221 | 5/1964 | Bergman | 59—85 |

CHARLES W. LANHAM, *Primary Examiner.*